US008939044B2

(12) United States Patent
Ueno

(10) Patent No.: US 8,939,044 B2
(45) Date of Patent: Jan. 27, 2015

(54) RETAINER MADE OF SYNTHETIC RESIN FOR USE IN A DEEP GROOVE BALL BEARING; DEEP GROOVE BALL BEARING; AND GEAR SUPPORT DEVICE

(75) Inventor: Takashi Ueno, Iwata (JP)

(73) Assignee: NTN Corporation, Osaka (JP)

( * ) Notice: Subject to any disclaimer, the term of this patent is extended or adjusted under 35 U.S.C. 154(b) by 167 days.

(21) Appl. No.: 13/321,854

(22) PCT Filed: Jun. 18, 2010

(86) PCT No.: PCT/JP2010/060364
§ 371 (c)(1),
(2), (4) Date: Nov. 22, 2011

(87) PCT Pub. No.: WO2010/150707
PCT Pub. Date: Dec. 29, 2010

(65) Prior Publication Data
US 2012/0060634 A1 Mar. 15, 2012

(30) Foreign Application Priority Data

Jun. 26, 2009 (JP) ................................. 2009-152456
Jul. 15, 2009 (JP) ................................. 2009-166411

(51) Int. Cl.
*F16H 55/17* (2006.01)
*F16C 19/16* (2006.01)
(Continued)

(52) U.S. Cl.
CPC ............... *F16C 19/163* (2013.01); *F16C 19/06* (2013.01); *F16C 33/3875* (2013.01);
(Continued)

(58) Field of Classification Search
CPC .. F16C 33/58; F16C 33/6681; F16C 33/3875; F16C 19/06; F16C 19/163; F16C 2361/61; F16H 2048/405
USPC ........ 74/458, 570.3, 573.13, 594; 384/29, 37, 384/55
See application file for complete search history.

(56) References Cited

U.S. PATENT DOCUMENTS 4,451,098 A 5/1984 Farley et al.
(Continued)

FOREIGN PATENT DOCUMENTS

DE 37 38 129 5/1989
(Continued)

OTHER PUBLICATIONS

International Search Report issued Sep. 7, 2010 in International (PCT) Application No. PCT/JP2010/060364.
(Continued)

*Primary Examiner* — Troy Chambers
*Assistant Examiner* — Zakaria Elahmadi
(74) *Attorney, Agent, or Firm* — Wenderoth, Lind & Ponack, L.L.P.

(57) ABSTRACT

A retainer made of a synthetic resin for use in a deep groove ball bearing is proposed of which the lubricity has been improved. The retainer includes a cylindrical first split retainer member (41) having a first axial side, and a cylindrical second split retainer member (42) having a second axial side coupled to the first axial side of the first split retainer member (41). Circumferentially spaced apart first and second cutouts (45 and 50) are formed in the first axial side of the first split retainer member (41) and the second axial side of the second split retainer member (42), respectively, which define respective pockets for receiving balls with the split retainers (41 and 42) coupled together. A coupling arrangement (X) is provided between the first and second split retainer members (41 and 42) which is adapted to engage the split retainer members (41 and 42) when the split retainer members (41 and 42) are coupled together, thereby keeping the split retainer members (41 and 42) axially inseparable from each other. With the retainer mounted in a deep groove ball bearing, when the outer race (11) and the inner race (21) rotate relative to each other, since the first and second split retainer members (41 and 42) rotate at different peripheral speeds due to a difference in diameter therebetween, pumping action is produced in the bearing, which causes a forced flow of lubricating oil in the bearing.

23 Claims, 8 Drawing Sheets

(51) Int. Cl.
*F16C 19/06* (2006.01)
*F16C 33/38* (2006.01)
*F16C 33/66* (2006.01)
*F16C 33/58* (2006.01)
*F16H 48/40* (2012.01)

(52) U.S. Cl.
CPC ............ *F16C 33/6681* (2013.01); *F16C 33/58* (2013.01); *F16H 2048/405* (2013.01); *F16C 2361/61* (2013.01)
USPC .............................................. 74/458; 384/29

(56) References Cited

U.S. PATENT DOCUMENTS

| | | | |
|---|---|---|---|
| 5,833,373 A * | 11/1998 | Ueno et al. ..................... | 384/527 |
| 6,688,771 B2 * | 2/2004 | Hoya et al. ..................... | 384/523 |
| 6,688,772 B2 * | 2/2004 | Yamamoto et al. ............ | 384/531 |
| 6,715,923 B2 * | 4/2004 | Miyazaki et al. .............. | 384/500 |
| 7,056,247 B2 * | 6/2006 | Fujiwara et al. ............... | 474/199 |
| 7,703,986 B2 * | 4/2010 | Naito .............................. | 384/526 |
| 8,011,833 B2 * | 9/2011 | Hirata et al. ................... | 384/527 |
| 2004/0161183 A1 * | 8/2004 | Miyazaki et al. .............. | 384/504 |
| 2004/0211063 A1 * | 10/2004 | Aida ............................... | 29/892.1 |
| 2005/0063627 A1 * | 3/2005 | Ueda et al. ..................... | 384/523 |
| 2006/0171622 A1 * | 8/2006 | Ohata et al. .................... | 384/513 |
| 2007/0014498 A1 * | 1/2007 | Aoki et al. ..................... | 384/448 |
| 2008/0053778 A1 * | 3/2008 | Shimomura et al. ........... | 192/45 |
| 2011/0069918 A1 * | 3/2011 | Wakuda et al. ................ | 384/482 |

FOREIGN PATENT DOCUMENTS

| | | |
|---|---|---|
| EP | 1 707 647 | 10/2006 |
| FR | 2 532 383 | 3/1984 |
| JP | 63-139323 | 9/1988 |
| JP | 9-264321 | 10/1997 |
| JP | 2000-145795 | 5/2000 |
| JP | 2003-254342 | 9/2003 |
| JP | 2005-180666 | 7/2005 |
| JP | 2006-258172 | 9/2006 |
| JP | 2008-121817 | 5/2008 |

OTHER PUBLICATIONS

English translation of the Written Opinion of the International Searching Authority issued Sep. 7, 2010 in PCT/JP2010/060364.

European Search Report issued Oct. 7, 2013 in corresponding European Patent Application No. 10792025.8.

* cited by examiner

RETAINER MADE OF SYNTHETIC RESIN FOR USE IN A DEEP GROOVE BALL BEARING; DEEP GROOVE BALL BEARING; AND GEAR SUPPORT DEVICE

TECHNICAL FIELD

The present invention relates to a retainer made of a synthetic resin for use in a deep groove ball bearing, a deep groove ball bearing using such a retainer, and a gear support device.

BACKGROUND ART

FIG. 10 shows a differential including a differential case 3 to which the rotation of a final drive gear 1 of a transmission is transmitted through a final driven gear 2, which is supported by the differential case 3, a pair of pinions 5 fixed to respective pinions shafts 5, side gears 6a and 6b which mesh with the pinions 5, whereby rotation of the differential case 3 is transmitted to the side gears 6a and 6b through the pinions 5, and then to left and right axles 7a and 7b which support the side gears 6a and 6b, respectively. The differential case 3 has tubular portions 8a and 8b as shafts on both sides thereof which are rotatably supported by a pair of bearings B, respectively, which are supported by a housing 9.

The final driven gear 2 of the differential, which is supported by the differential case 3, is a helical gear. Thus, when the final driven gear 2 rotates, thrust loads act on the differential case 3.

In order to receive such thrust loads, tapered rollers bearings are used as the bearings B supporting the differential case 3 to rotatably support the differential case 3.

A helical gear is also used in an automotive transmission to transmit torque. Thus when a shaft supporting this helical gear rotates, radial loads and thrust loads act on the shaft supporting the helical gear.

Thus, a tapered roller bearing is used to support a shaft supporting a bevel gear in an automotive transmission too.

But since tapered roller bearings are large in load bearing capacity and thus torque, which tends to increase fuel consumption. In order to improve fuel economy, deep groove ball bearings should be used instead because deep groove ball bearings are lower in torque loss.

Deep groove ball bearings comprise an outer race, an inner race, balls mounted between the inner and outer races, and a retainer retaining the balls. The retainer may be made of a metal or may be made of a synthetic resin as disclosed in Patent document 1.

PRIOR ART DOCUMENTS

Patent Documents

Patent document 1: JP Patent Publication 2006-258172A

SUMMARY OF THE INVENTION

Object of the Invention

Conventional retainers for use in deep groove ball bearings, of either type, have the function of simply retaining the balls. Thus, conventional deep groove ball bearings are inferior in the ability to pass lubricating oil (lubricity) compared to tapered roller bearings, so that if deep groove ball bearings are used at high rotational speeds and under high loads, such as in differentials and transmissions, heat build-up tends to occur, which could deteriorate durability.

Also, if excessive loads act on a standard deep groove ball bearing, the balls may move onto the shoulders of the bearing races on which thrust loads are acting, thus damaging the edges of the shoulders.

A first object of the present invention is to provide a retainer made of a synthetic resin for use in a deep groove ball bearing of which the lubricity has been improved, a deep groove ball bearing using such a retainer, and a gear support device.

A second object of the present invention is to provide a deep groove roller bearing which is durable and which completely prevents the balls from moving onto the shoulders of the bearing races.

Means to Achieve the Object

In order to achieve the first object, the present invention provides a retainer made of a synthetic resin for use in a deep groove ball bearing, the retainer comprising a cylindrical first split retainer member made of a synthetic resin, and a cylindrical second split retainer member made of a synthetic resin and configured to be inserted in the first split retainer member, wherein the first split retainer member has a first axial side in which first cutouts are formed so as be circumferentially spaced apart from each other, and the second split retainer member has a second axial side in which second cutouts are formed so as be circumferentially spaced apart from each other, wherein each of the first cutouts and the corresponding second cutout form a circular pocket for receiving a ball of the deep groove ball bearing when the second split retainer member is inserted into the first split retainer member, the retainer further comprising a coupling means for keeping the split retainer members axially inseparable from each other with the first and second cutouts forming the pockets for receiving respective balls of the deep groove ball bearing.

The deep groove ball bearing according to this invention comprises an outer race formed with a raceway groove on a radially inner surface thereof, an inner race formed with a raceway groove on a radially outer surface thereof, balls mounted between the raceway groove of the outer race and the raceway groove of the inner race, and a retainer retaining the balls, wherein the retainer comprises the above-mentioned retainer made of a synthetic resin.

In assembling this deep groove ball bearing, after mounting the balls between the inner and outer races, the first split retainer member is inserted into the bearing from one side of the inner and outer races until the balls are received in the respective cutouts of the first split retainer member, and then the second split retainer member is inserted into the bearing from the other side of the inner and outer races until the balls are received in the respective cutouts of the second split retainer member, thereby fitting the second axial side portion of the second split retainer member in the first axial side portion of the first split retainer member. In this state, the split retainer members are coupled together by the coupling means.

Such a deep groove ball bearing or bearings are used e.g. to support tubular portions or shafts of a differential shown in FIG. 10, or an input shaft of a transmission. When the shaft rotates in this state and the inner and outer races of the bearing rotate relative to each other, its balls revolve around the axis of the bearing while rotating about their own axes. Due to the revolution of the balls, any lubricating oil disposed between the inner and outer races, which is in contact with the retainer, moves around the axis of the bearing together with the retainer.

In this state, since the first and second split retainer members have different outer diameters and thus are rotating at different peripheral speeds, the portion of the lubricating oil in contact with the first split retainer member flows faster than the portion of the lubricating oil in contact with the second split retainer member. As a result, the lubricating oil flowing at a slower speed is drawn toward the lubricating oil flowing at a higher speed, thus producing pumping action in the bearing. Due to the pumping action, the lubricating oil flows in one direction in the bearing, so that the interior of the bearing is forcibly lubricated.

The coupling means may comprise first engaging claws radially inwardly protruding from each of bridges defined between the adjacent first cutouts of the first split retainer member, second engaging claws radially outwardly protruding from each of bridges defined between the adjacent second cutouts of the second split retainer member, first engaging recesses formed in a radially inner surface of the first split retainer member, and second engaging recesses formed in a radially outer surface of a second split retainer member, wherein first engaging claws are engageable in the respective second engaging recesses, and the second engaging claws are engageable in the respective first engaging recesses.

Preferably, the first and second engaging claws are engageable in the respective second and first engaging recesses at three or more locations to more reliably join the first and second split retainer members together.

The first and second cutouts may have a plan shape of a more than half-circle, with an opposed pair of pocket claws formed at an open end of each of the cutouts, and each have a spherical surface that extends along the outer periphery of the ball received therein. Alternatively, the first and second cutouts may have a plan shape of the letter U, whereby each pair of the first and second cutouts define a cylindrical pocket for receiving a ball of the deep groove ball bearing when the first and second split retainer members are coupled together.

In the arrangement in which the cutouts have a plan shape of a more than half-circle, it is possible to effectively prevent separation of the split retainer members due to the engagement of the engaging claws in the engaging recesses and the engagement between the pocket claws and the balls.

In the arrangement in which the cutouts have a plan shape of the letter U, it is possible to easily mount the retainer in the bearing without the possibility of the balls interfering with the retainer when the retainer is mounted.

In the arrangement in which the cutouts have a plan shape of a more than half-circle, a first circumferential gap defined between each engaging claw and a corresponding engaging recess is preferably larger than a second circumferential gap defined between each of the pockets and the ball received therein. With this arrangement, even if the balls are moved faster or slower than the retainer under large moment loads, and as a result, the first split retainer member and the second split retainer member rotate relative to each other, the engaging claws never abut the circumferentially opposed side walls of the corresponding engaging recesses. This prevents damage to the engaging claws.

A first axial gap defined between each engaging claw and a corresponding engaging recess is preferably larger than a second axial gap defined between each of the pockets and the ball received therein. With this arrangement, even if the first split retainer member and the second split retainer member are moved axially away from each other under axial force, the inner surfaces of the opposed pairs of pocket claws abut the outer peripheries of the respective balls first, thus preventing the engaging claws from abutting the axial end surfaces of the engaging recesses, respectively. This prevents damage to the engaging claws.

In the arrangement in which the cutouts have a plan shape of the letter U, a first circumferential gap defined between each engaging claw and a corresponding engaging recess is preferably larger than a second circumferential gap defined between each of the pockets and the ball received therein. With this arrangement, even if the balls are moved faster or slower than the retainer under large moment loads, and as a result, the first split retainer member and the second split retainer member rotate relative to each other, the engaging claws never abut the circumferentially opposed side walls of the corresponding engaging recesses. This prevents damage to the engaging claws.

Since the deep groove ball bearing is lubricated with lubricating oil, the first and second split retainer members are preferably made of an oil-resistant synthetic resin. Such resins include polyamide 46 (PA46), polyamide 66 (PA66) and polyphenylene sulfide (PPS). Among these resins, polyphenylene sulfide (PPS) is most oil-resistant, so that if oil resistance is important, polyphenylene sulfide (PPS) should be selected.

In the cost of the resin is important, polyamide 66 (PA66) is preferable. Thus, the most suitable resin should be selected according to the kind of lubricating oil used.

Preferably, the outer race has a first shoulder on a first side of the raceway groove of the outer race and a second shoulder on a second side of the raceway groove of the outer race, the inner race has a third shoulder on the first side of the raceway groove of the inner race and a fourth shoulder on the second side of the raceway groove of the inner race, wherein the first shoulder and the fourth shoulder have a height. H1 which is higher than the height of the second and third shoulders, and wherein the ratio of the height H1 of the first and fourth shoulders to the diameter d of the balls (H1/d) is in the range of between 0.25 and 0.50. With this arrangement, after mounting the inner race into the outer race, by moving the inner race radially relative to the outer race until the radially outer surface of the inner race partially contacts a portion of the radially inner surface of the outer race, a space larger than the diameter of the balls is defined between the inner and outer races at a position diametrically opposite to the contact portion between the inner and outer races, so that balls can be reliably mounted between the inner and outer races.

When this deep groove ball bearing is used in a gear support device using a helical gear, such as a differential or a transmission, the bearing is preferably mounted such that the higher shoulder of its inner race is located closer to the helical gear. With this arrangement, it is possible to reliably support thrust loads produced when torque is transmitted to the helical gear with the respective higher shoulders of the inner and outer races, and prevent the balls from moving onto the shoulders.

Advantages of the Invention

According to the present invention, the second split retainer member of the retainer, which has a smaller diameter than the first split retainer member, has its other side portion inserted in the one side portion of the first split retainer member, and in this state, the coupling means are engaged to keep the first and second split retainer means axially inseparable from each other. Thus when this retainer is mounted in a deep groove ball bearing, and the inner and outer races of the bearing rotate relative to each other, since the first and second split retainer members rotate at different peripheral speeds due to a difference in diameter therebetween, pumping action is produced in the bearing. The pumping action causes a forced flow of lubricating oil in the bearing, thus improving lubricating properties of the deep groove ball bearing.

The deep groove ball bearing according to the present invention has a first shoulder on a first side of the raceway groove of the outer race, a second shoulder on a second side of the raceway groove of the outer race, a third shoulder on the first side of the raceway groove of the inner race and a fourth shoulder on the second side of the raceway groove of the inner race, wherein the first shoulder and the fourth shoulder have a height H1 which is higher than the height of the second and third shoulders, and wherein the ratio of the height H1 of the first and fourth shoulders to the diameter d of the balls (H1/d) is in the range of between 0.25 and 0.50. With this arrangement, it is possible to completely prevent the balls from moving onto the shoulders.

BRIEF DESCRIPTION OF THE DRAWINGS

FIG. 6(I) is a plan view of the first split retainer member of FIG. 5, showing the circumferential pocket gap defied between the pocket and the ball received in the pocket.

BEST MODE FOR EMBODYING THE INVENTION

Figure 1:
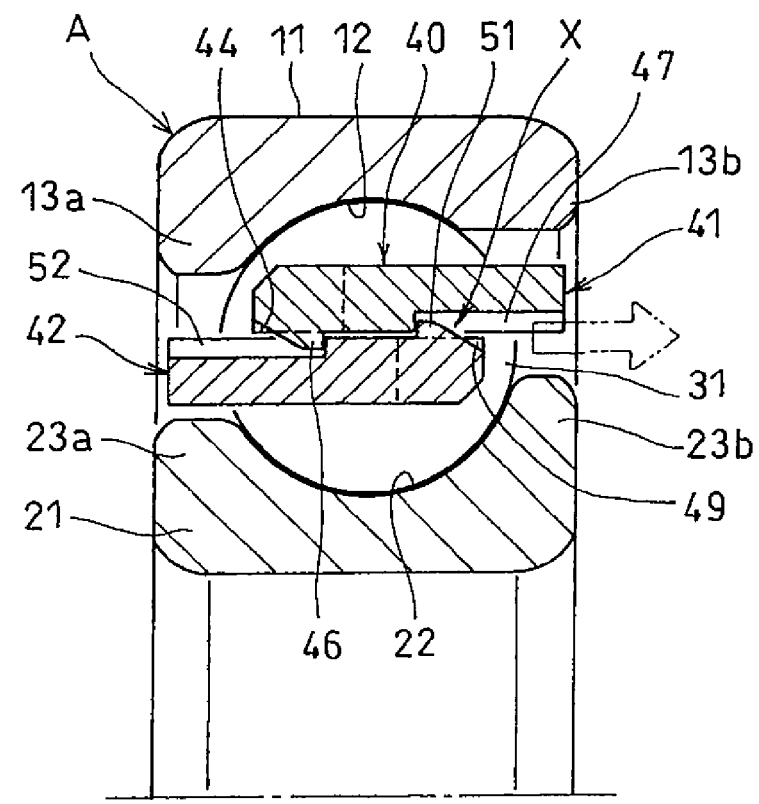
FIG. 1 is a vertical sectional front view of a deep groove ball bearing including a retainer made of synthetic resin according to the present invention.
Figure 1:
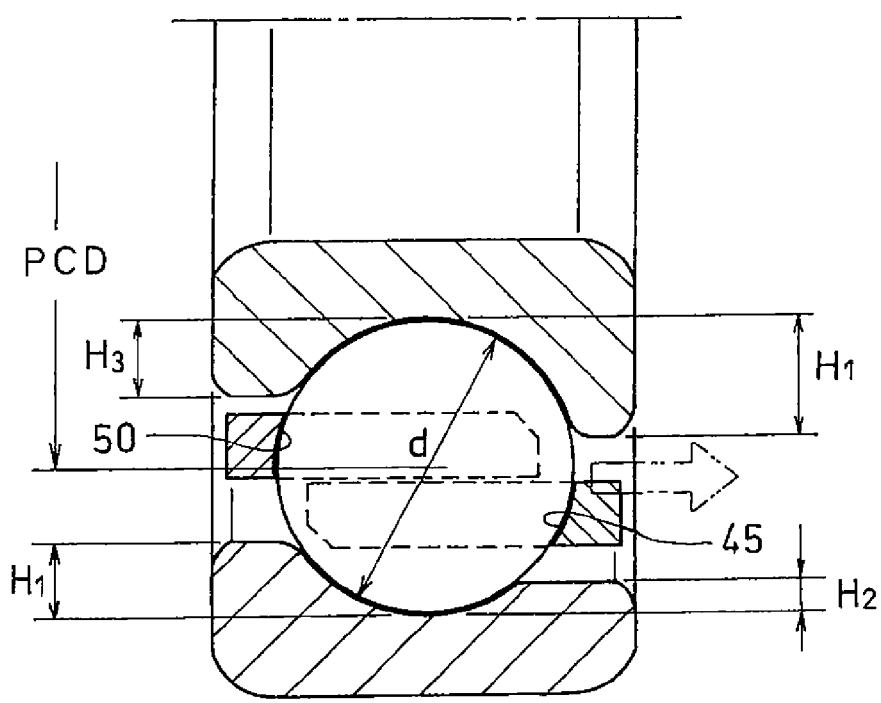

Now the embodiment of the present invention is described. As shown in FIG. 1, the deep groove ball bearing A according to the invention comprises an outer race 11 formed with a raceway groove 12 on its radially inner surface, an inner race 21 formed with a raceway groove 22 on its radially outer surface, balls 31 disposed between the raceway grooves 12 and 22, and a retainer 40 retaining the balls 31.

The raceway groove 12 of the outer race 11 has first and second shoulders 13a and 13b on first and second sides of the raceway groove 12, respectively, of which the first shoulder 13a is higher than the second shoulder 13b. The raceway groove 22 of the inner race 21 has first and second shoulders 23a and 23b on the first and second sides of the raceway groove 22, respectively, of which the second shoulder 23b is higher than the first shoulder 23a.

Here, the lower shoulders 13b and 23a are of the same height as the shoulders of standard deep groove ball bearings. But they may be lower the shoulders of standard deep groove ball bearings. Standard deep groove ball bearings refer to bearings of which the first and second shoulders on both sides of the raceway of each of the inner and outer races are of the same height.

For the sake of description, the higher shoulders 13a and 23b are hereinafter referred to as the shoulders 13a and 23b under thrust loads, and the lower shoulders 13b and 23a are hereinafter referred to as the shoulders 13b and 23a under no thrust loads.

The ratio of the height H1 of the shoulders 13a and 23b under thrust loads to the diameter d of the balls 31, i.e. ratio H1/d is determined within the range of 0.25-0.50.

Figure 2:
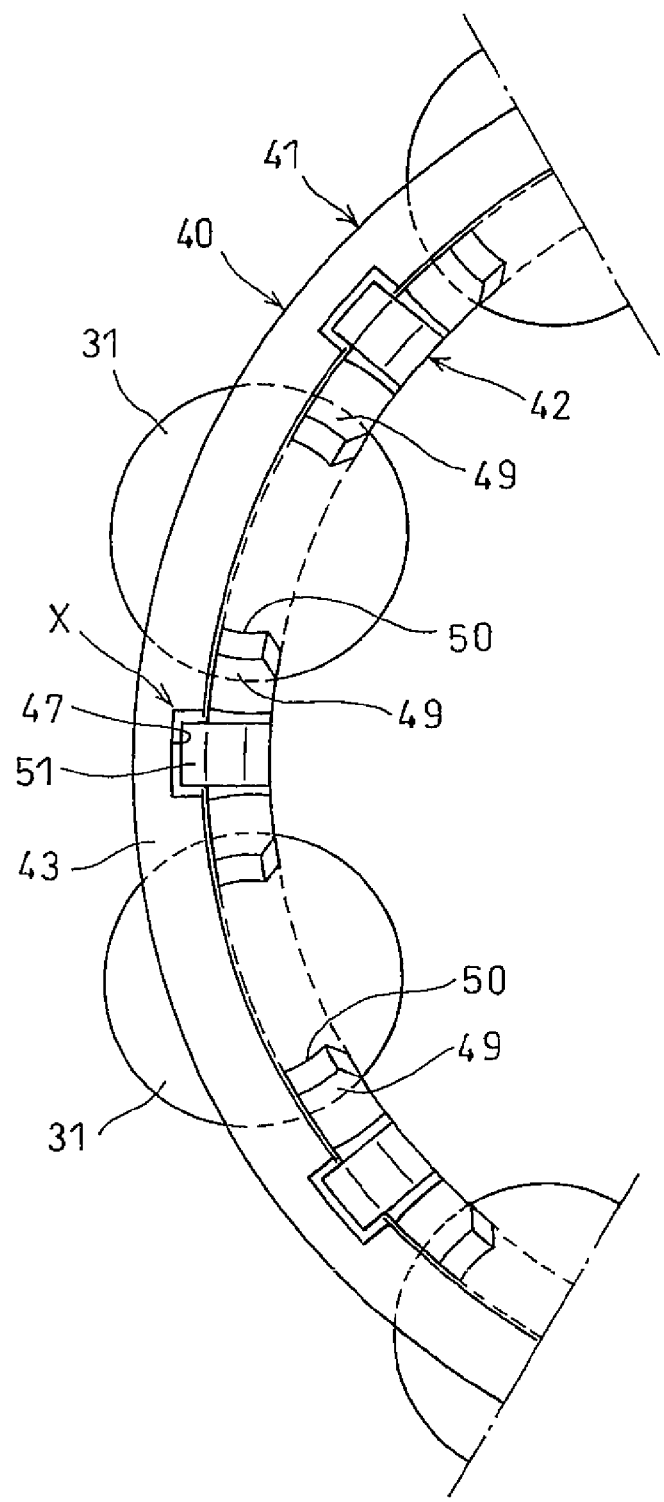
FIG. 2 is a partial right-hand side view of the retainer of FIG. 1.
Figure 3:
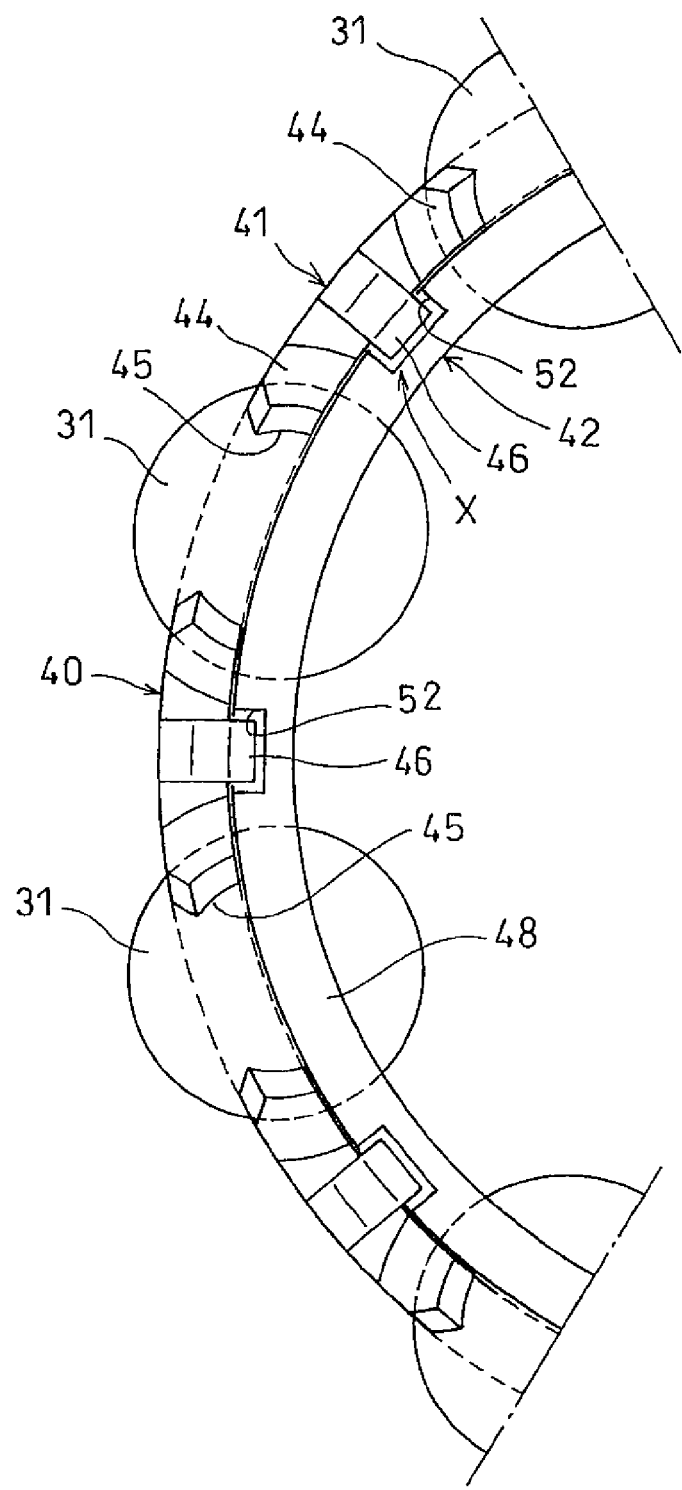
FIG. 3 is a partial left-hand side view of the retainer of FIG. 1.

As shown in FIGS. 1-3, the retainer 40 comprises a first split retainer member 41 and a second split retainer member 42 inserted in the first split retainer member 41.

Figure 5:
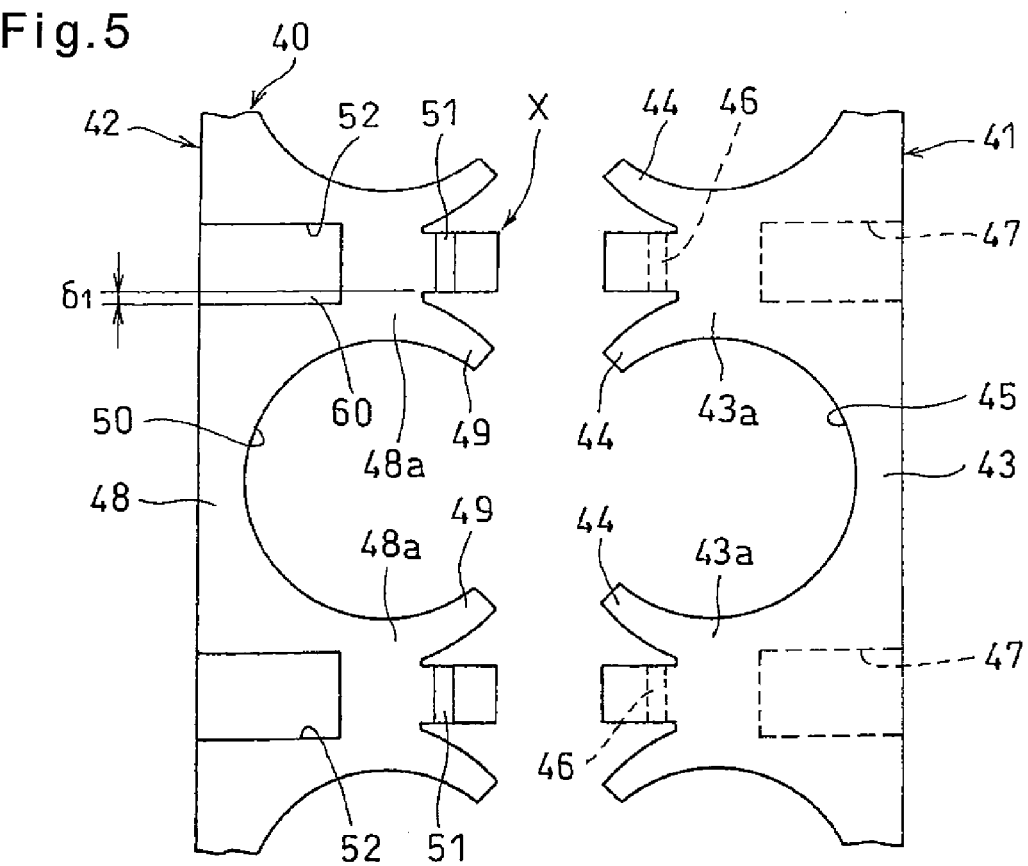
FIG. 5 is a partial plan view of the first and second split retainer members.

As shown in FIG. 5, the first split retainer member 41 comprises an annular member 43 made of a synthetic resin and having, on a first axial side thereof, a plurality of opposed pairs of pocket claws 44, the respective pairs being circumferentially equidistantly spaced apart from each other. A cutout 45 is formed between each opposed pair of pocket claws 44 which has a plan shape of a more than half-circle and extends through the annular member 43 in the thickness direction thereof.

As shown in FIG. 1, the annular member 43 has an inner diameter substantially equal to the pitch circle diameter (PCD) of the balls 31, and has an outer diameter in the range between the inner diameter of the higher shoulder 13a of the outer race 11 and the inner diameter of the lower shoulder 13b of the outer race 11. The cutouts 45 have spherical inner surfaces extending along the outer peripheries of the respective balls 31.

The second split retainer member 42 comprises an annular member 48 made of a synthetic resin and having, on a second axial side thereof, a plurality of opposed pairs of pocket claws 49, the respective pairs being circumferentially equidistantly spaced apart from each other. A cutout 50 is formed between each opposed pair of pocket claws 49 which has a plan shape of a more than half-circle and extends through the annular member 48 in the thickness direction thereof.

As shown in FIG. 1, the annular member 48 has an outer diameter substantially equal to the pitch circle diameter (PCD) of the balls 31, and has an inner diameter in the range between the outer diameter of the higher shoulder 23b of the inner race 21 and the outer diameter of the lower shoulder 23a of the inner race 21. The second split retainer member 42 can be inserted into the bearing with its side formed with the lower shoulder 23a first so as to be fitted into the first split retainer member 41. The cutouts 50 have spherical inner surfaces extending along the outer peripheries of the respective balls 31.

Figure 4:
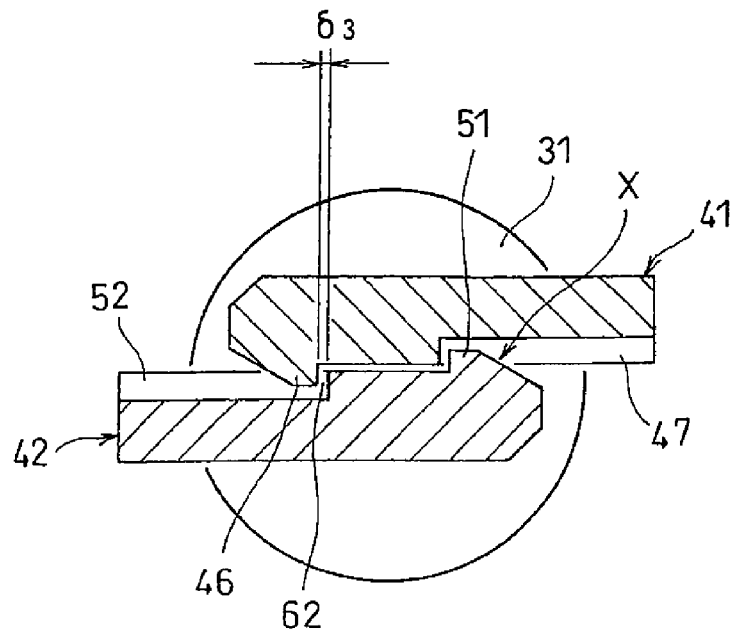
FIG. 4 is a partial enlarged sectional view of the retainer of FIG. 1, showing portions of its first and second split retainer members where the first and second split retainer members are coupled together.

As shown in FIGS. 4 and 5, coupling means X is provided between the first split retainer member 41 and the second split retainer member 42 for keeping the first and second split retainer members 41 and 42 axially inseparable, with the second axial side portion of the second split retainer member 42 inserted in the first axial side portion of the first split retainer member 41, thereby defining a circular pocket by each opposed pair of cutouts 45 and 50.

The coupling means X comprises radially inwardly extending engaging claws 46 formed on the free end portions of bridges 43a defined between the adjacent cutouts 45, groove-shaped engaging recesses 47 formed on the radially inner surface of the annular member 43 so as to be axially aligned with the respective engaging claws 46, radially outwardly extending engaging claws 51 formed on the free end portions of bridges 48a defined between the adjacent cutouts 50, engaging recesses 52 formed on the radially outer surface of the annular member 48 so as to be axially aligned with the respective engaging claws 51. By the engagement between the engaging claws 46 of the first split retainer member 41 and the respective engaging recesses 52 of the second split retainer member 42 and by the engagement between the engaging claws 51 of the second split retainer member 42 and the respective engaging recesses 47 of the first split retainer member 41, the first and second split retainer members 41 and 42 are kept axially inseparable from each other.

Since the first split retainer member 41 and the second split retainer member 42 are brought into contact with lubricating oil for lubricating the deep groove ball bearing, they should be made of an oil-resistant synthetic resin. Such oil-resistant synthetic resins include polyamide 46 (PA46), polyamide 66 (PA66) and polyphenylene sulfide (PPS). A suitable one may be selected from these resins according to the kind of lubricating oil.

In assembling this deep groove ball bearing, the inner race 21 is inserted into the outer race 11, and the balls 31 are mounted between the raceway groove 22 of the inner race 21 and the raceway groove 12 of the outer race 11.

At this time, the inner race 21 is radially moved relative to the outer race 11 until the radially outer surface of the inner race 21 partially contacts a portion of the radially inner surface of the outer race 11, thereby defining a crescent space between the inner and outer races at a position diametrically opposite to the contact portion between the inner and outer races, and the balls 31 are inserted into this crescent space from one side thereof.

When mounting the balls 31, if the height H1 of the shoulder 13a under thrust loads of the outer race 11 or that of the higher shoulder 23b of the inner race 21 should be unnecessarily high, it would be difficult to mount the balls 31. But in the embodiment of this invention, the ratio of the height H1 to the diameter d of the balls 31, i.e. H1/d is equal to or less than 0.50, the balls 31 can be reliably mounted between the outer race 11 and the inner race 21.

After mounting the balls 31, the inner race 21 is moved back to the position where its center coincides with the center of the outer race 11, and the balls 31 are rearranged so as to be circumferentially equidistantly spaced apart from each other. In this state, the first split retainer member 41 is inserted between the outer race 11 and the inner race 21 from the side of the lower shoulder 13b of the outer race 11 until the balls 31 fit into the respective cutouts 45 of the first retainer member 41.

The second split retainer member 42 is inserted between the outer race 11 and the inner race 21 from the side of the lower shoulder 23a of the inner race 21 until the balls 31 fit into the respective cutouts 50 of the second split retainer member 42 so that the second axial side portion of the second split retainer member 42 is fitted in and engages the first axial side portion of the first split retainer member 41.

By fitting the second split retainer member 42 into the first split retainer member 41, as shown in FIGS. 1 and 4, the engaging claws 46 and 51 of the respective split retainer members 41 and 42 engage the respective engaging recesses 52 and 47 of the opposite split retainer members 42 and 41. The deep groove ball bearing is thus assembled.

Thus, the deep groove ball bearing A can be easily assembled simply by mounting the balls 31 between the raceway 12 of the outer race 11 and the raceway 22 of the inner race 21, and inserting first split retainer member 41 and the second split retainer member 42 between the outer race 11 and the inner race 21 from the respective opposite sides until the second split retainer member 42 is fitted in the first split retainer member 41.

In FIG. 1, the lower shoulders 13b and 23a under no thrust loads are of the same height as the shoulders of standard deep groove ball bearings, but may be lower than the shoulders of standard deep groove ball bearings.

If the shoulders 13b and 23a under no thrust loads are lower in height than the shoulders of standard deep groove ball bearings, it is possible to increase the radial thickness of the first and second split retainer members 41 and 42 by the difference between the height of the shoulders 13b and 23a and the height of the shoulders of the standard deep groove ball bearings, thereby increasing the strength of the retainer 40.

But if the shoulders 13b and 23a under no thrust loads are unnecessarily low, the balls 31 may move onto the shoulders 13b or 23a. Thus, preferably, the height H2 of the shoulder 13b of the outer race 11 is determined so that the ratio of the height H2 to the diameter d of the balls 31, i.e. H2/d is within the range of 0.09-0.50, and the height H3 of the shoulder 23a of the inner race 21 is determined such that the ratio of the height H3 to the diameter d of the balls 31, i.e. H3/d is within the range of 0.18-0.50.

Figure 9:
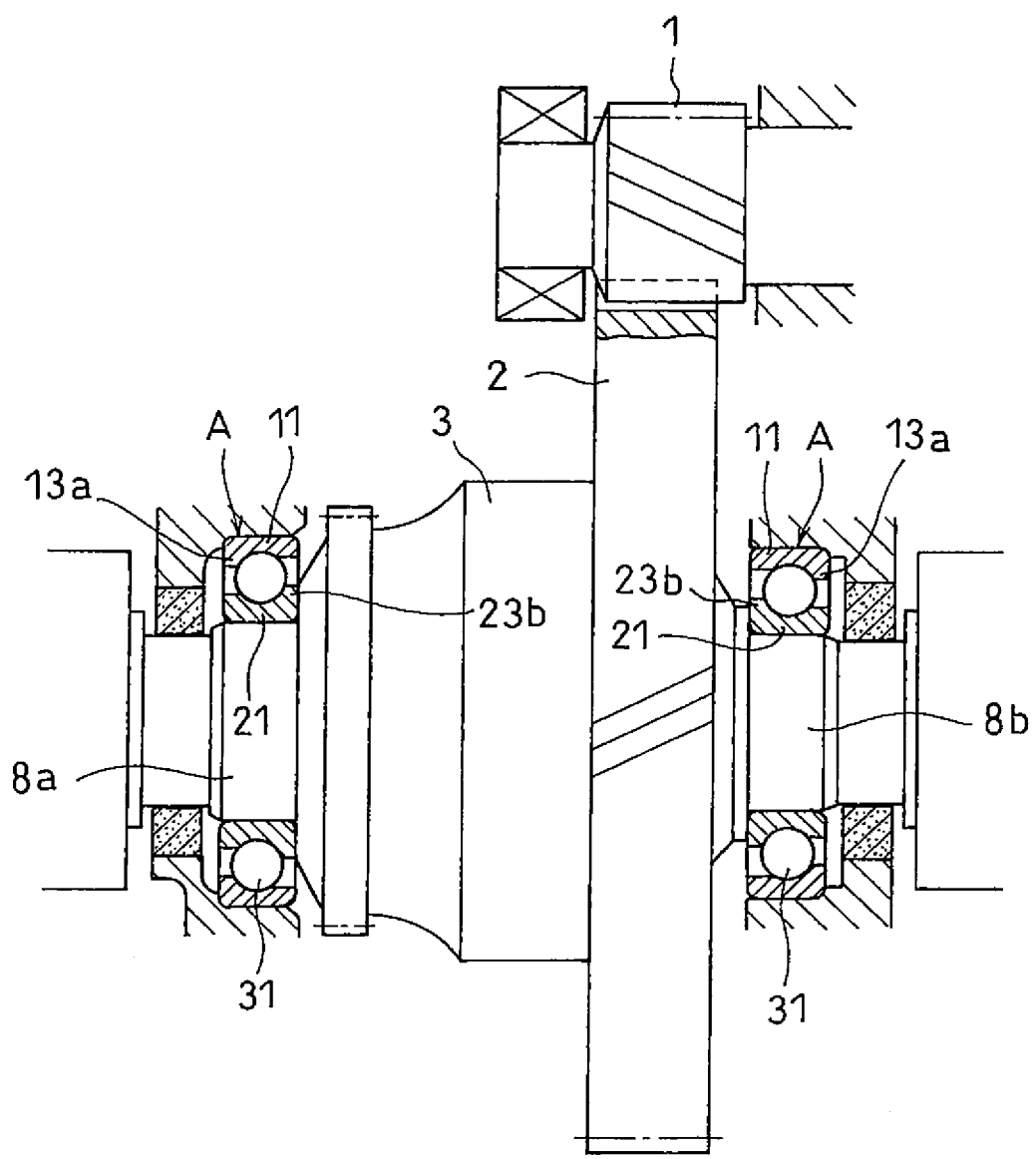
FIG. 9 is a sectional view of a gear support device.
Figure 10:
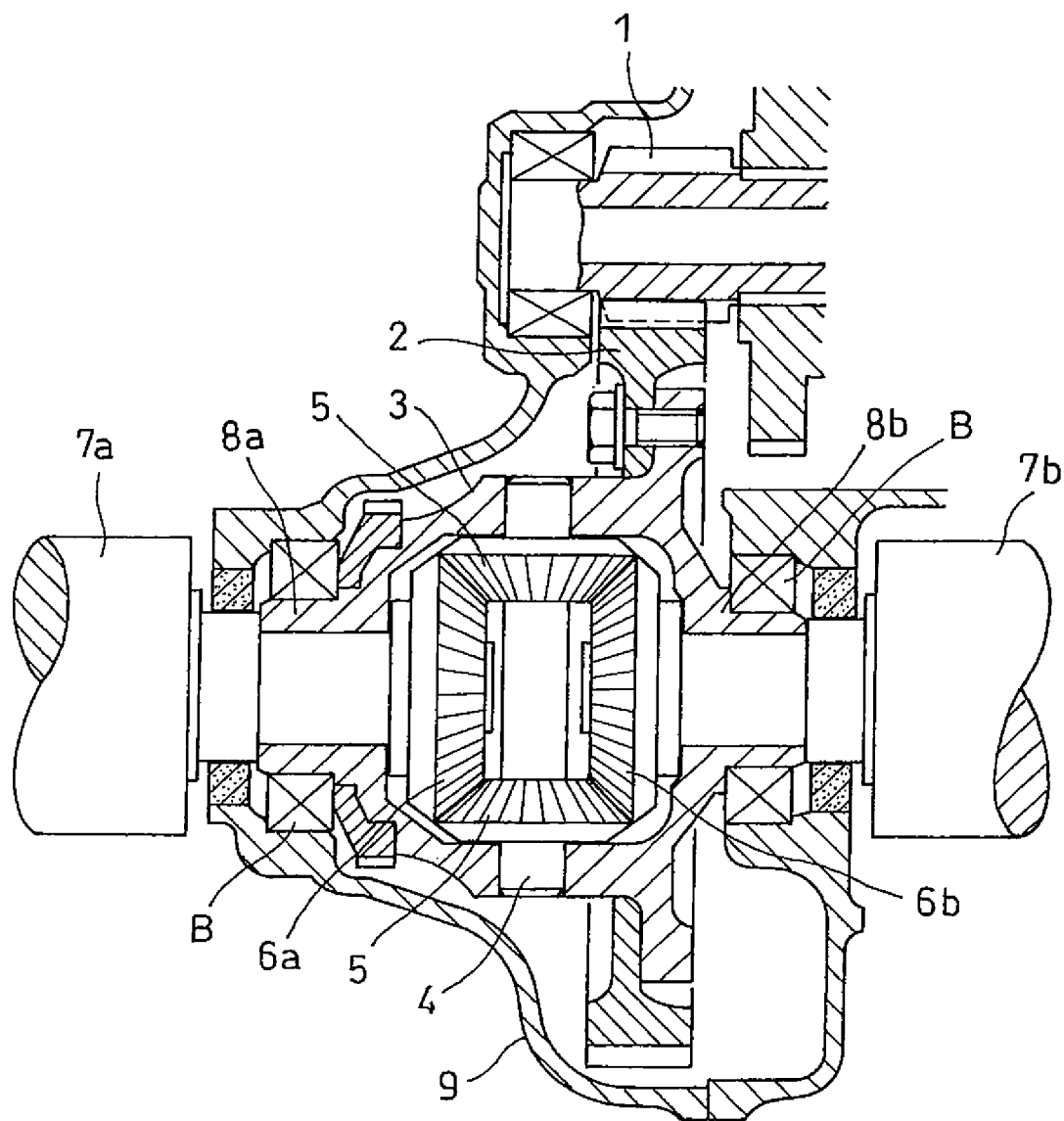
FIG. 10 is a sectional view of a differential.

FIG. 9 shows how two of the deep groove ball bearings A of the above embodiment can be used to support the tubular portions 8a and 8b formed on both sides of the differential case 3 shown in FIG. 10 as shafts. The deep groove ball bearings A are positioned such that the shoulder 23b under thrust loads of the inner race 21 of each bearing A is located closer to the final driven gear 2.

In this gear support device, when torque is transmitted from the final drive gear 1 and the differential case 3 is rotated in the direction in which the vehicle is driven in the forward direction, the outer race 11 and the inner race 21 rotate relative to each other, and the balls 31 revolve around the axis of the bearing, while rotating about their own axes. When the balls 31 revolve around the axis of the bearing, the retainer 40 is rotated together. Any lubricating oil disposed between the outer race 11 and the inner race 21 also rotates because it is in contact with the retainer 40.

At this time, since the first split retainer member 41 and the second split retainer member 42 have different outer diameters, their peripheral speeds are different from each other. Thus, lubricating oil that is in contact with the first split retainer member 41 flows faster than lubricating oil that is in contact with the second split retainer member 42. As a result, the lubricating oil flowing at a slower speed is drawn toward the lubricating oil flowing at a higher speed, thus producing pumping action in the bearing. Due to the pumping action, the lubricating oil flows in the direction of the arrows in FIG. 1, so that the interior of the bearing is forcibly lubricated. This improves lubricity of the deep groove ball bearings A.

In the deep groove ball bearing of the embodiment, each ball 31 is embraced by the opposed pairs of pocket claws 44 and 49 formed at the opening of each cutout 45 of the first split retainer member 41 and at the opening of each cutout 50 of the second split retainer member 42, respectively. The first and second split retainer members 41 and 42 are combined such that each opposed pair of pocket claws 44 formed on the first split retainer member 41 extend in a direction opposite to the direction in which each opposed pair of pocket claws 49 formed on the second split retainer member, with the engaging claws 46 and 51 engaged in the 52 and 47, respectively, thereby keeping the first split retainer member 41 and the second split retainer member 42 axially inseparable from each other. Thus even if the balls 31 are moved faster or slower than the retainer 40 under large moment loads, the retainer 40 will never separate.

As shown in FIG. 6(I), the dimension δ1 of the circumferential gap 60 defined between each of the engaging claws 46 and 51 and the corresponding one of the engaging recesses 52 and 47 is larger than the dimension δ2 of the circumferential pocket gap 61 defined between each ball 31 and each of the corresponding cutouts 45 and 50. With this arrangement, even if the balls 31 are moved faster or slower than the retainer 40 under large moment loads, and as a result, the first split retainer member 41 and the second split retainer member 42 rotate relative to each other, the engaging claws 46 and 51 never abut the circumferentially opposed side walls of the corresponding engaging recesses 52 and 47. This prevents damage to the engaging claws 46 and 51.

Figure 6:
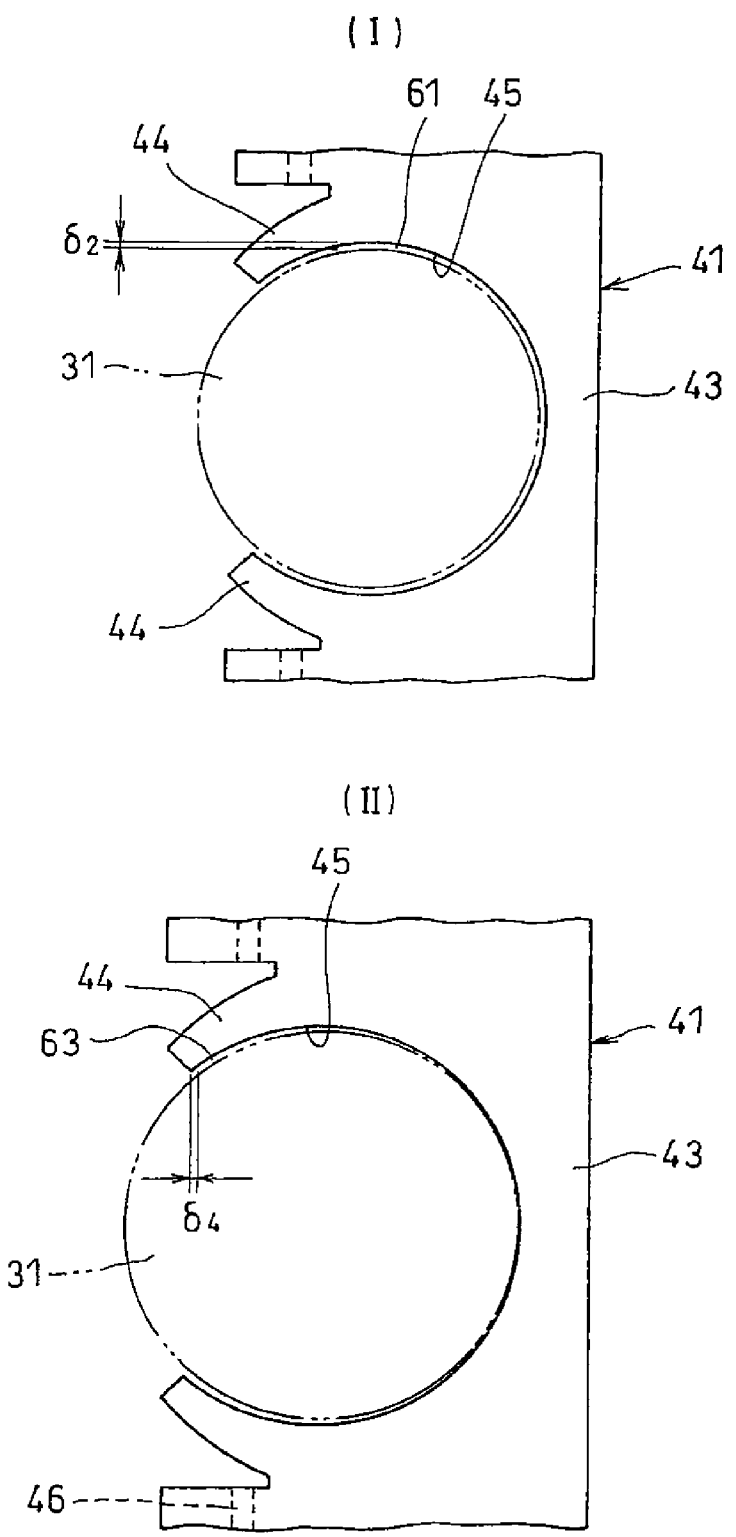
FIG. 6(II) is a plan view of the first split retainer member of FIG. 5, showing the axial pocket gap between the pocket and the ball received in the pocket.

As shown in FIG. 6(II), the dimension δ3 of the axial gap 62 defined between each of the engaging claws 46 and 51 and the corresponding one of the engaging recesses 52 and 47 is larger than the dimension δ4 of the axial pocket gap 63 defined between each ball 31 and each of the corresponding cutouts 45 and 50. With this arrangement, even if the first split retainer member 41 and the second split retainer member 42 are moved axially away from each other under axial force, the inner surfaces of the opposed pairs of pocket claws 44 and 49 abut the outer peripheries of the respective balls 31 first, thus preventing the engaging claws 46 and 51 from abutting the axial end surfaces of the engaging recesses 52 and 47, respectively. This prevents damage to the engaging claws 46 and 51.

With the deep groove ball bearings A mounted in position as shown in FIG. 9, when the differential case 3 rotates in the direction in which the vehicle moves forward, thrust force is applied to the differential case 3 due to the rotation of the final driven gear 2, which is a helical gear. The thrust force is supported by the shoulder 23b under thrust loads of the inner race 21 and the shoulder 13a under thrust loads of the outer race 11, of the deep groove ball bearing A on the left-hand side of FIG. 9.

At this time, thrust force is also applied to the balls 31. Thus, if the shoulder 23b under thrust loads of the inner race 21 and the shoulder 13a under thrust loads of the outer race 11 are unnecessarily low in height, the balls 31 may move onto the shoulders 13a and 23b, thus damaging the edges of the shoulders 13a and 23b.

In the embodiment, since the ratio of the height H1 of these shoulders to the diameter d of the balls 31, i.e. H1/d is determined to be 0.25 or higher, it is possible to reliably prevent the balls 31 from moving onto the shoulders 13a and 23b.

A standard deep groove ball bearing 6208C as a comparative example and a deep groove ball bearing according to the present invention were prepared. The comparative example includes an inner race having an outer diameter of 53.1 mm, and an outer race having an inner diameter of 68.1 mm. The bearing according to the present invention is the same as the comparative example except that the shoulder under thrust loads of the inner race has an outer diameter of 56.6 mm instead of 53.1. mm of the corresponding shoulder of the comparative example, and that the shoulder under thrust loads of the outer race has an inner diameter of 65.5 mm instead of 68.1 mm of the corresponding shoulder of the comparative example. Permissible thrust loads were measured for the comparative example and the bearing according to the present invention. The permissible thrust load of the deep groove ball bearing according to this invention was higher by 305% than that of the deep groove ball bearing as the comparative example. Another deep groove ball bearing was prepared which is identical to the above bearing according to this invention except that the shoulder under no thrust loads (axial loads) of the inner race has an outer diameter 51.9 mm instead of the standard 53.1 mm, and that the shoulder under no axial loads of the outer race has an inner diameter of 70.4 mm instead of the standard 68.1 mm. When a basic static load Co was applied to this bearing, the balls never moved onto the shoulders under no axial loads.

When the differential case 3 rotates in the direction in which the vehicle moves backward, thrust force applied to the differential case 3 is supported by the shoulder 23b under thrust loads of the inner race 21 and the shoulder 13a under thrust loads of the outer race 11, of the deep groove ball bearing A on the right-hand side of FIG. 9. In this case too, since the ratio of the height H1 of the shoulders under thrust loads to the diameter d of the balls 31 is 0.25 or higher, it is possible to reliably prevent the balls 31 from moving onto the shoulders.

In FIGS. 1 and 5, the cutouts 43 and 48 have a plan shape of a more than half-circle and an arcuate sectional shape, and extend through the respective annular members 43 and 48 in the thickness direction thereof. The cutouts 45 and 50 are however not limited to those shown in FIGS. 1 and 5. For example, as shown in FIG. 7, the cutouts may have a plan shape of the letter U so that they form cylindrical pockets when the first split retainer member 41 and the second split retainer member 42 are fitted together.

Figure 7:
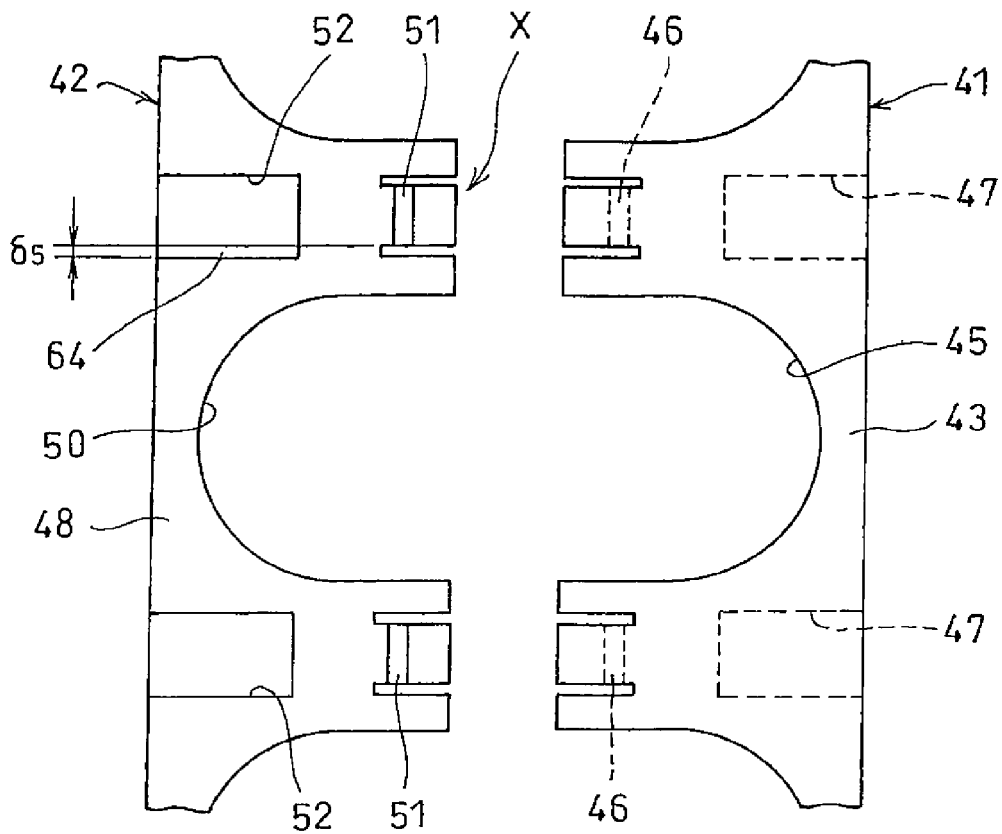
FIG. 7 is a partial plan view of a different retainer made of a synthetic resin according to the present invention.
Figure 8:
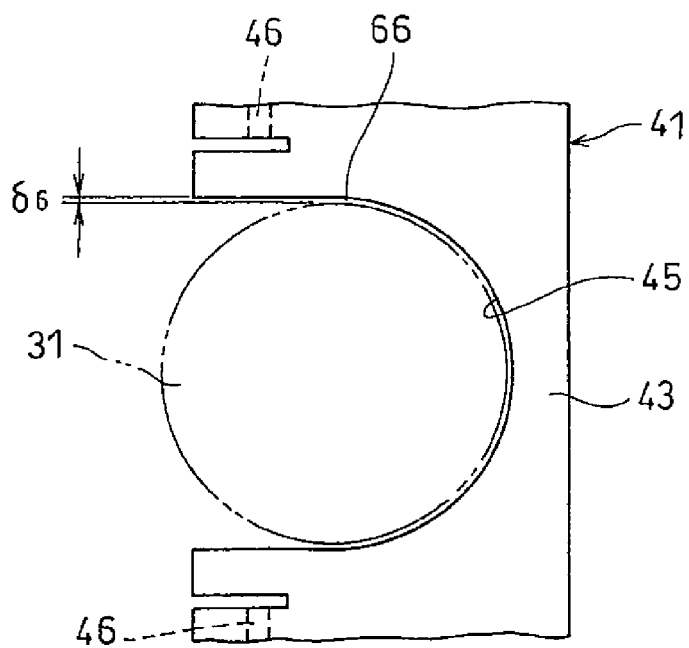
FIG. 8 is a plan view of the first split retainer member of FIG. 7, showing a circumferential gap defined between its pocket and a ball received in the pocket.

In the arrangement of FIG. 7, as shown in FIGS. 7 and 8, the dimension δ5 of the circumferential gap 64 defined between each of the engaging claws 46 and 51 and the corresponding one of the engaging recesses 52 and 47 is larger than the dimension δ6 of the circumferential pocket gap 66 defined between each ball 31 and each of the corresponding cutouts 45 and 50. With this arrangement, even if the balls 31 are moved faster or slower than the retainer 40 under large moment loads, and as a result, the first split retainer member 41 and the second split retainer member 42 rotate relative to each other, the engaging claws 46 and 51 never abut the circumferentially opposed side walls of the corresponding engaging recesses 52 and 47. This prevents damage to the engaging claws 46 and 51.

In FIG. 9, the tubular portions 8a and 8b on both sides of the differential case 3 are supported by the deep groove ball bearings A as shown in FIG. 1, respectively. But instead, only one of the tubular portions 8a and 8b may be supported by the deep groove ball bearing A of FIG. 1, and the other of the tubular portions may be supported by a cylindrical roller bearing, an angular ball bearing or a tapered roller bearing. By supporting at least one of the tubular portions 8a and 8b with the deep groove ball bearing A of FIG. 1, it is possible to reduce the torque loss compared to the case in which both tubular portions are supported by tapered roller bearings, thereby improving fuel economy.

DESCRIPTION OF THE NUMERALS

11. Outer race
12, 22. Raceway groove
13a, 13b, 23a, 23b. Shoulder
21. Inner race
31. Ball
40. Retainer
41. First split retainer member
42. Second split retainer member
43a. Bridge
44, 49. Pocket claw
45, 50. Cutout
46, 51. Engaging claw 47, 52. Engaging recess
48a. Bridge
60, 62, 64. Circumferential gap
61, 63, 65. Circumferential pocket gap
X. Coupling means

What is claimed is:

1. A retainer made of a synthetic resin for use in a deep groove ball bearing, said retainer comprising:
    a cylindrical first split retainer member made of a synthetic resin; and
    a cylindrical second split retainer member made of a synthetic resin and configured to be inserted in the first split retainer member,
    wherein the first split retainer member has a first axial side in which first cutouts are formed so as be circumferentially spaced apart from each other, and the second split retainer member has a second axial side in which second cutouts are formed so as be circumferentially spaced apart from each other, an axial direction of the first and second split retainer members being perpendicular to a circumferential direction of the first and second split retainer members,
    wherein a coupling arrangement is configured to keep the split retainer members axially joined to each other with the second split retainer member being inserted into the first split retainer member,
    wherein the first cutouts and the second cutouts are arranged in pairs when the split retainer members are joined, and each pair forms a circular pocket when the second split retainer member is inserted into the first split retainer member for receiving a ball of the deep groove ball bearing in the circular pocket,
    wherein the split retainer members are configured such that a radially outer surface portion of the second split retainer member protrudes beyond a distal end of the first split retainer member in the axial direction when the split retainer members are joined, and the radially outer surface portion of the second split retainer member has a diameter smaller than a diameter of a radially outer surface of the first split retainer member,
    wherein the split retainer members are configured such that a radially inner surface portion of the first split retainer member protrudes beyond a distal end of the second split retainer member in the axial direction when the split retainer members are joined, and the radially inner surface portion of the first split retainer member has a diameter larger than a diameter of a radially inner surface of the second split retainer member.

2. The retainer of claim 1, wherein the first split retainer member includes bridges disposed between adjacent ones of the first cutouts,
    wherein the second split retainer member includes bridges disposed between adjacent ones of the second cutouts,
    wherein the coupling arrangement comprises:
    first engaging claws protruding radially inwardly from each of the bridges of the first split retainer member,
    second engaging claws protruding radially outwardly from each of the bridges of the second split retainer member,
    first engaging recesses formed in a radially inner surface of the first split retainer member,
    second engaging recesses formed in a radially outer surface of the second split retainer member,
    wherein the first engaging claws are configured to engage in the second engaging recesses respectively and the second engaging claws are configured to engage the first engaging recesses respectively when the split retainer members are joined.

3. The retainer of claim 2, wherein the first engaging claws are disposed at three or more locations, the second engaging claws are disposed at three or more locations, the first engaging recesses are disposed at three or more locations, and the second engaging recesses are disposed at three or more locations.

4. The retainer of claim 1, wherein the first and second cutouts have a plan shape of a more than half-circle, with an opposed pair of pocket claws formed at an open end of each of the cutouts, and
    wherein each of the first and second cutouts has a spherical surface that extends along the outer periphery of the ball received therein.

5. The retainer of claim 2,
    wherein the first and second cutouts have a plan shape of a more than half-circle, with an opposed pair of pocket claws formed at an open end of each of the cutouts,
    wherein each of the first and second cutouts has a curved surface that extends along the outer periphery of the ball received therein,
    wherein a first circumferential gap is defined between each engaging claw and a corresponding engaging recess, and a second circumferential gap is defined between each of said pockets and the ball received therein, and
    wherein the first circumferential gap is larger than the second circumferential gap.

6. The retainer of claim 2,
    wherein the first and second cutouts have a plan shape of a more than half-circle, with an opposed pair of pocket claws formed at an open end of each of the cutouts,
    wherein each of the first and second cutouts has a curved surface that extends along the outer periphery of the ball received therein,
    wherein a first axial gap is defined between each engaging claw and a corresponding engaging recess, and a second axial gap is defined between each of said pockets and the ball received therein, and wherein the first axial gap is larger than the second axial gap.

7. The retainer of claim 1, wherein the first and second cutouts have a plan shape of the letter U, and each pair of the first and second cutouts define a cylindrical pocket for receiving a ball of the deep groove ball bearing when the first and second split retainer members are coupled together.

8. The retainer of claim 2,
    wherein the first and second cutouts have a plan shape of the letter U, and each pair of the first and second cutouts define a pocket for receiving a ball of the deep groove ball bearing when the first and second split retainer members are coupled together,
    wherein a first circumferential gap is defined between each engaging claw and a corresponding engaging recess, and a second circumferential gap is defined between each of said pockets and the ball received therein, and wherein the first circumferential gap is larger than the second circumferential gap.

9. The retainer of claim 1, wherein the first and second split retainer members are made of one of polyamide 46, polyamide 66 and polyphenylene sulfide.

10. A deep groove ball bearing comprising:
    an outer race formed with a raceway groove on a radially inner surface thereof;
    an inner race formed with a raceway groove on a radially outer surface thereof;
    balls mounted between the raceway groove of the outer race and the raceway groove of the inner race; and
    the retainer of claim 1, wherein the retainer retains the balls.

11. The deep groove ball bearing of claim 10, wherein the outer race has a first shoulder on a first side of the raceway groove of the outer race and a second shoulder on a second side of the raceway groove of the outer race,
   wherein the inner race has a third shoulder on the first side of the raceway groove of the inner race and a fourth shoulder on the second side of the raceway groove of the inner race,
   wherein the first shoulder and the fourth shoulder have a height H1 which is higher than the height of the second and third shoulders,
   wherein the ratio of the height H1 of the first and fourth shoulders to the diameter d of the balls (H1/d) is between 0.25 and 0.50,
   wherein each of the first and second shoulders has a radially inner surface, and the radially inner surface of the first shoulder has a smaller diameter than the radially inner surface of the second shoulder, and
   wherein each of the third and fourth shoulders has a radially outer surface, and the radially outer surface of the third shoulder has a smaller diameter than the radially outer surface of the fourth shoulder.

12. A gear support device comprising:
   a shaft having a helical gear; and
   first and second bearings rotatably supporting the shaft on opposite sides of the helical gear, respectively, whereby a thrust load applied to the shaft while the helical gear is rotating in one direction is supported by the first bearing,
   wherein each of the first bearing and the second bearing is constituted by a deep groove ball bearing according to claim 11, and the fourth shoulder of the inner race of each of the deep groove ball bearings is located closer to the helical gear.

13. The retainer of claim 2, wherein the first and second cutouts have a plan shape of a more than half-circle, with an opposed pair of pocket claws formed at an open end of each of the cutouts, and
   wherein each of the first and second cutouts has a spherical surface that extends along the outer periphery of the ball received therein.

14. The retainer of claim 3, wherein the first and second cutouts have a plan shape of a more than half-circle, with an opposed pair of pocket claws formed at an open end of each of the cutouts, and
   wherein each of the first and second cutouts has a spherical surface that extends along the outer periphery of the ball received therein.

15. The retainer of claim 5, wherein a first axial gap is defined between each engaging claw and a corresponding engaging recess, and a second axial gap is defined between each of said pockets and the ball received therein, and wherein the first axial gap is larger than the second axial gap.

16. The retainer of claim 2, wherein the first and second cutouts have a plan shape of the letter U, and each pair of the first and second cutouts define a pocket for receiving a ball of the deep groove ball bearing when the first and second split retainer members are coupled together.

17. The retainer of claim 3, wherein the first and second cutouts have a plan shape of the letter U, and each pair of the first and second cutouts define a pocket for receiving a ball of the deep groove ball bearing when the first and second split retainer members are coupled together.

18. A deep groove ball bearing comprising:
   an outer race formed with a raceway groove on a radially inner surface thereof;
   an inner race formed with a raceway groove on a radially outer surface thereof;
   balls mounted between the raceway groove of the outer race and the raceway groove of the inner race; and
   the retainer of claim 2, wherein the retainer retains the balls.

19. A deep groove ball bearing comprising:
   an outer race formed with a raceway groove on a radially inner surface thereof;
   an inner race formed with a raceway groove on a radially outer surface thereof;
   balls mounted between the raceway groove of the outer race and the raceway groove of the inner race; and
   the retainer of claim 3, wherein the retainer retains the balls.

20. A deep groove ball bearing comprising:
   an outer race formed with a raceway groove on a radially inner surface thereof;
   an inner race formed with a raceway groove on a radially outer surface thereof;
   balls mounted between the raceway groove of the outer race and the raceway groove of the inner race; and
   the retainer of claim 4, wherein the retainer retains the balls.

21. A deep groove ball bearing comprising:
   an outer race formed with a raceway groove on a radially inner surface thereof;
   an inner race formed with a raceway groove on a radially outer surface thereof;
   balls mounted between the raceway groove of the outer race and the raceway groove of the inner race; and
   a retainer configured to retain the balls, the retainer including
      a cylindrical first split retainer member made of a synthetic resin, and
      a cylindrical second split retainer member made of a synthetic resin and inserted in the first split retainer member,
   wherein the first split retainer member has a first axial side in which first cutouts are formed so as be circumferentially spaced apart from each other, and the second split retainer member has a second axial side in which second cutouts are formed so as be circumferentially spaced apart from each other,
   wherein a coupling arrangement is configured to keep the split retainer members axially joined to each other with the second split retainer member being inserted into the first split retainer member,
   wherein the split retainer members are joined to each other with the first cutouts and the second cutouts arranged in pairs, and each pair forms a circular pocket for receiving a ball of the deep groove ball bearing in the circular pocket,
   wherein the outer race has a first shoulder on a first side of the raceway groove of the outer race and a second shoulder on a second side of the raceway groove of the outer race,
   wherein the inner race has a third shoulder on the first side of the raceway groove of the inner race and a fourth shoulder on the second side of the raceway groove of the inner race,
   wherein each of the third and fourth shoulders has a radially outer surface, and the radially outer surface of the third shoulder has a smaller diameter than the radially outer surface of the fourth shoulder,
   wherein the first split retainer member has a radially outer surface, at an end of the first split retainer closest to the first shoulder, which is larger in diameter than the radially inner surface of the first shoulder and smaller in diameter than the radially inner surface of the second shoulder, and the second split retainer member has a radially inner surface, at an end of the second split retainer member closest to the fourth shoulder, which is larger in diameter than the radially outer surface of the third shoulder and smaller in diameter than the radially outer surface of the fourth shoulder, such that the first split retainer member can be inserted into the outer race from a side of the outer race having the second shoulder and the second split retainer member can be inserted into the outer race from a side of the outer race having the first shoulder, and such that the retainer cannot be pulled out of the outer race in either axial direction when the first and second split members are coupled.

22. The retainer of claim 21, wherein the first split retainer member includes bridges disposed between adjacent ones of the first cutouts,
   wherein the second split retainer member includes bridges disposed between adjacent ones of the second cutouts,
   wherein the coupling arrangement comprises:
   first engaging claws protruding radially inwardly from each of the bridges of the first split retainer member,
   second engaging claws protruding radially outwardly from each of the bridges of the second split retainer member,
   first engaging recesses formed in a radially inner surface of the first split retainer member,
   second engaging recesses formed in a radially outer surface of the second split retainer member,
   wherein the split retainer members are joined with the first engaging claws engaged in the second engaging recesses respective and the second engaging claws engaged in the first engaging recesses.

23. A retainer made of a synthetic resin for use in a deep groove ball bearing, said retainer comprising:
   a cylindrical first split retainer member made of a synthetic resin; and
   a cylindrical second split retainer member made of a synthetic resin and configured to be inserted in the first split retainer member,
   wherein the first split retainer member has a first axial side in which first cutouts are formed so as be circumferentially spaced apart from each other, and the second split retainer member has a second axial side in which second cutouts are formed so as be circumferentially spaced apart from each other,
   wherein a coupling arrangement is configured to keep the split retainer members joined to each other in an axial direction of the first and second split retainer members with the second split retainer member being inserted into the first split retainer member,
   wherein the first cutouts and the second cutouts are arranged in pairs when the split retainer members are joined, and each pair forms a circular pocket when the second split retainer member is inserted into the first split retainer member for receiving a ball of the deep groove ball bearing in the circular pocket,
   wherein the split retainer members are configured such that a radially outer surface portion of the second split retainer member protrudes beyond a distal end of the first split retainer member in the axial direction when the split retainer members are joined, and the radially outer surface portion of the second split retainer member has a diameter smaller than a diameter of a radially outer surface of the first split retainer member,
   wherein the split retainer members are configured such that a radially inner surface portion of the first split retainer member protrudes beyond a distal end of the second split retainer member in the axial direction when the split retainer members are joined, and the radially inner surface portion of the first split retainer member has a diameter larger than a diameter of a radially inner surface of the second split retainer member.

* * * * *